United States Patent Office 3,423,365
Patented Jan. 21, 1969

3,423,365
CROSSLINKED POLYIMIDES AND THEIR PREPARATION
Erhard F. Hoegger, Ardentown, Wilmington, Del., assignor to E. I. du Pont de Nemours and Company, Wilmington, Del., a corporation of Delaware
No Drawing. Filed May 2, 1966, Ser. No. 546,553
U.S. Cl. 260—65  3 Claims
Int. Cl. C08g 20/32

ABSTRACT OF THE DISCLOSURE

Process, and product thereof, for producing infusible and insoluble aromatic polyimides by crosslinking using a free-radical producing catalyst.

---

This invention relates to polyamide-acid and polyimide polymers.

According to the present invention, a process is provided for making high temperature stable, fusible and/or soluble polyimides infusible and insoluble by crosslinking in a reaction using a free-radical producing catalyst.

The process comprises heating, in the presence of a free-radical producing catalyst, a soluble linear aromatic polyimide or soluble linear aromatic polyimide precursor, said polyimide or polyimide precursor having attached to, or as part of, the main chain at least one benzylic CH group per thirty polymer units. In the resulting products, the crosslinking bridge is a direct carbon to carbon bond between carbon atoms in two of said benzylic CH groups in said polymer.

The term "benzylic CH" group is used in its normal sense in the art to mean a CH, $CH_2$ or $CH_3$ group attached directly to an aromatic ring. Exemplary polyimides of this class are those based, at least in part, on the following diamines and/or tetracarboxylic acids:

bis(4-aminophenyl)methane
2,4-diaminoisopropylbenzene
4,4'-diaminotriphenylmethane
bis(4-aminobenzyl)ether
4,4'-diaminobibenzyl
2,4-diaminotoluene
2,4-diaminophenylacetone
2,4-diaminophenylacetylacetone
1,1-bis(3,4-dicarboxyphenyl)ethane
1,1-bis(2,3-dicarboxyphenyl)ethane
bis(2,3-dicarboxyphenyl)methane
bis(3,4-dicarboxyphenyl)methane Position isomers of these are also suitable.

The heating of the soluble aromatic crosslinkable polyimide or polyimide precursor will be at a temperature and for a time sufficient to crosslink the linear polymer and render it insoluble. Ordinarily, temperatures above 100° C. will be used and temperatures above about 130° C. are preferred for faster results. No advantage is presently seen in using temperatures above about 500° C. Heating, dependent of course inversely on the temperature, will ordinarily be at least 2 seconds, with 2 or 3 minutes being usually sufficient for most purposes at about 130° C. and 30 to 120 minutes at about 100°–110° C.

The terms soluble and insoluble are also used herein in their normal sense to mean solubility with reference to whatever solvent medium the polyimide or polyimide precursor may be in at the time of processing according to this invention, such as N,N-dimethylacetamide. An insoluble polymer is one which does not disolve to an extent more than about 1% by weight concentration in a given solvent.

In the case of soluble linear aromatic polyimides containing the benzylic CH group and crosslinkable according to this invention, such polyimides can be a polyimide of one or more of the above or other benzylic CH containing aromatic diamines and/or aromatic tetracarboxylic acids, or, when smaller amounts of these groups are wanted, copolyimides of one or more of these with other suitable aromatic diamines and/or aromatic tetracarboxylic acids can be used.

Some such polyimides themselves are sufficiently soluble in ordinary solvents such as N,N-dimethylacetamide, N,N-dimethylformamide, etc., that the free radical-producing catalyst can be mixed into solution prior to heating to effect the crosslinking. Illustrative aromatic polyimides of this type are described in Angelo United States patent application Ser. No. 323,232 filed Nov. 13, 1963, and now abandoned; Oken United States patent application Ser. No. 339,097 filed Jan. 1, 1964, and now abandoned; and Rogers United States application Ser. No. 335,383 filed Jan. 2, 1964, and now abandoned; all three applications being assigned to the same assignee as that of the present application and all three being incorporated herein by reference. In the case of such polyimides, the heating step, in the presence of the free radical producing catalyst, causes the polyimide to become insoluble, stiff and infusible.

Some other aromatic polyimides containing benzylic CH groups are themselves quite insoluble, stiff and infusible. Hence, according to the present invention it is necessary in such cases to mix the free radical producing catalyst with a soluble precursor of the aromatic polyimide prior to cyclizing and crosslinking. In such a case the crosslinking by heating should be effected when the polyimide or its precursor is in its desired final shape since the insolubility and infusibility of the crosslinked polymer makes subsequent shaping impossible.

By soluble aromatic polyimide precursors is meant a soluble polymer convertible by heating or chemical treatment or both to polyimide. These materials and techniques for their conversion are known. Representative precursors are aromatic polyamide-acids such as described for example in Edwards U.S. Patent No. 3,179,614 issued Apr. 20, 1965, and Lindsey and Locey U.S. patent application Ser. No. 468,140 filed June 29, 1965 and now abandoned; aromatic polyisoimides described for example in Angelo U.S. patent application Ser. No. 325,479 filed Nov. 21, 1963 and now U.S. Patent 3,282,898; aromatic polyamide-esters described for example in Angelo U.S. patent application Ser. No. 311,307 filed Sept. 25, 1963 and now U.S. Patent 3,316,211; Angelo U.S. patent application Ser. No. 311,326 filed Sept. 25, 1963 and now U.S. Patent 3,282,897, Sorenson U.S. patent application Ser. No. 288,535 filed June 17, 1963 and now U.S. Patent 3,212,663, Tatum U.S. patent application Ser. No. 325,497 filed Nov. 21, 1963 and now U.S. Patent 3,261,811, and Tocker U.S. patent application Ser. No. 332,889 filed Dec. 23, 1963 and now U.S. Patent 3,326,851; and aromatic polyamide-amides described for example in Angelo and Tatum U.S. patent application Ser. No. 325,442 filed Nov. 21, 1963 and now U.S. Patent 3,316,212; all assigned to the same assignee as that of the present application and incorporated herein by reference.

When one of these precursors, provided it contains the required one or more benzylic CH groups per thirty polymer units, is heated with the free radical catalyst, crosslinking occurs in conjunction with the usual cyclization reaction to form the imide rings. Ordinarily, from 0.25 to 25%, and preferably from 1% to about 10% by weight of catalyst will be used, based on the weight of the polymer.

Suitable free radical producing catalysts are organic peroxides having the general formula X—O—O—X' wherein X is a hydrocarbon or oxyhydrocarbon group, e.g., an alkyl, cycloalkyl, aryl, aralkyl or acyl radical and X′ is hydrogen, a hydrocarbon or oxyhydrocarbon group, e.g., alkyl, aryl, aralkyl, or acyl. Specific examples of the above organic peroxides which are deserving of special mention are: where X and X′ are alkyl, dimethyl peroxide, diethyl peroxide, and di-t-butyl peroxide; where X and X′ are aralkyl, dicumyl peroxide; where X and X′ are acyl, di-acetyl peroxide, di-propionyl peroxide, dibutyryl peroxide, bis(heptafluorobutyryl)peroxide, dioctanoyl peroxide, dilauroyl peroxide, dibenzoyl peroxide, methoxy, methyl, t-butyl, chloro, bromo and cyano substituted benzoyl peroxides, bis-(p-chlorobenzoyl)peroxide, diisopropyl peroxydicarbonate, bis(2,4-dichlorobenzoyl)peroxide, anisoyl peroxide; where X is alkyl, alkaryl, or cycloalkyl and X′ is hydrogen, t-butyl hydroperoxide, n-octyl hydroperoxide, cumene hydroperoxide, diisopropyl benzene hydroperoxide, tetrallyl hydroperoxide, p-methane hydroperoxide, pinane hydroperoxide and 2,5-dimethylhexane-2,5-dihydroperoxide; where X is acyl and X′ is alkyl, cycloalkyl, aryl, hydrogen, t-butyl - peracetate, t-butyl - perbenzoate, di-t-butyl-diperphthalate and t-butyl-peroxyisobutyrate, peracetic acid, cyclohexanone peroxide, heptyl hydroperoxide and methyl ethyl ketone peroxide. Organic peroxides wherein X and X′ in the above formula are each a member selected from the group consisting of alkyl radicals having from 1 to 8 carbon atoms, aralkyl radicals having up to 10 carbon atoms and aryl radicals having from 7 to 13 carbon atoms are particularly preferred.

If a crosslinked polyimide foam is desired, azo type free-radical catalysts can be employed, since they evolve nitrogen which will foam the polymer. Such catalysts include:

2,2′-azobis(2-methylpropionitrile)
1,1′-azobis(1-cyanocyclohexane)
2,2′-azobis(2-methylpropionamide)
Dimethyl 2,2′-azobis(2-methylpropionate)

Utility includes adhesive applications, heat sealable coatings, self-supporting adhesive films, impregnants for fibers, papers and cloths, and uses as hard coatings, self-supporting films, and rigid structures. Crosslinking is particularly useful in the adhesive industry, into which polyimides are finding their way, to permit application of high solids solutions of a workable viscosity that will readily wet the surfaces which are to be bonded together. By means of crosslinking, the adhesive becomes insoluble and less fusible at the temperature at which the bond is made. As a result, the bond retains good strength but is no longer solvent-sensitive or fusible at end-use temperatures.

The invention will be further understood by reference to the following illustrative examples in which parts and percentages are by weight unless otherwise indicated.

EXAMPLE 1

Crosslinking caused by the action of a peroxide is demonstrated in this example.

To a stirred solution of 11.9 grams of 4,4′-diaminodiphenylmethane in 281 grams of dry N,N-dimethylacetamide (DMAC) under nitrogen, was added 19.3 grams of benzophenone-3,3′,4,4′-tetracarboxylic dianhydride in small portions. The inherent viscosity of the resulting polyamide-acid was 0.80 (0.5% in DMAC at 30° C.).

Portions of this 10% by weight polyamide-acid solution were coated onto 3-mil films of the polypyromellitimide of bis(4-aminophenyl) ether with a 20-mil doctor knife, and the films were dried, for measurement of heat-sealing properties, tabulated below.

To a 30-gram portion of the above 10% by weight polyamide-acid solutions was added 0.3 gram (10% by weight, based on polymer solids) of di-t-butyl peroxide, and this composition was similarly coated onto 3-mil polyimide films as above, and dried.

All heat seals were prepared at 400° C./30–40 seconds/approximately 500 pounds per square inch.

| | | Heat seal strengths for different drying temperature of coating (grams) | | |
|---|---|---|---|---|
| | | Crosslinking before sealing, 300° C./60 min. | Crosslinking after sealing 160° C./60 min. | 150° C./30 min |
| As prepared. | Peroxide cross-linked. | 1,040 | | 2,815 |
| | Control (no peroxide). | 1,355 | 2,520 | |
| Aged at 300° C. for 7 days in air. | Peroxide cross-linked. | 690 | | 1,860 |
| | Control (no peroxide). | 1,195 | 1,865 | |

This is a demonstartion of the crosslinking effect which takes place only at temperatures above 160° C. Di-t-butyl peroxide has a half-life of one minute at about 190° C. and a half-life of 100 minutes at 144° C. Thus, a coating composition containing t-butyl perodixed can be crosslinked and, therefore, be made infusible or almost infusible by treating at about 200° C. or above.

EXAMPLE 2

The polyamide-acid (inherent viscosity 0.25 measured as in Example 1) from cumene-2,4-diamine and the dianhydride of Example 1 was cast into films, both with and without 2% by weight of di-t-butyl peroxide, and dried at 100° C. for 1 hour. The gel film without peroxide upon slow heating became gummy (crosslinked polyamide-acid) at 175° C., while the film crosslinked with peroxide did not reach the gummy stage until the temperature was raised to 210° C. Further heating at 250° C. for 15 hours converts these to the corresponding polyimide films.

EXAMPLE 3

Soluble polyisoimides were made insoluble by heating for 5 minutes at 160° C. a DMAC solution of the polyisoimide of cumene diamine and pyromellitic dianhydride and the polyisoimide of cumene diamine and of the dianhydride of Example 1 by adding small quantities (about 2% by weight) of di-t-butyl peroxide.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. The process which comprises heating a polymer selected from the group consisting of a soluble linear aromatic polyimide and a soluble precursor of a linear aromatic polyimide, said polymer containing at least one benzylic CH group per thirty linear polymer units, in the presence of a catalytic amount of a free radical producing catalyst, at a temperature and for a time sufficient to provide an insoluble crosslinked aromatic polyamide.

2. The process which comprises admixing in solution in N,N-dimethylacetamide a polyamide-acid of 4,4′-diaminodiphenylmethane and benzophenone-3,3′,4,4′-tetracarboxylic dianhydride and 0.25–25% by weight, based on the weight of said polyamide-acid, of a free radical producing catalyst, and heating the admixture at a temperature in the range of about 100°–500° C. for 2 seconds to 2 hours to form the corresponding crosslinked polyamide.

3. A crosslinked polymer, said polymer selected from the group consisting of soluble linear aromatic polyimides and soluble linear aromatic polyimide precursors, said polyimides and said polyimide precursors having at least one benzylic CH group per thirty polymer units, the crosslinking bridge being a direct carbon to carbon bond between carbon atoms in two of said benzylic CH groups in said polymer.

References Cited
UNITED STATES PATENTS

| | | | |
|---|---|---|---|
| 3,179,630 | 4/1965 | Endrey | 260—78 |
| 3,277,043 | 10/1966 | Holub | 260—33.4 |

WILLIAM H. SHORT, *Primary Examiner.*

L. L. LEE, *Assistant Examiner*

U.S. Cl. X.R.

260—78, 47